United States Patent
Li et al.

(10) Patent No.: US 10,273,091 B2
(45) Date of Patent: Apr. 30, 2019

(54) FRACTURE DETECTION SYSTEM AND METHOD FOR DUMBBELL PIN OF SCRAPER CONVEYOR

(71) Applicant: CHINA UNIVERSITY OF MINING AND TECHNOLOGY, Xuzhou (CN)

(72) Inventors: Wei Li, Xuzhou (CN); Xing Zhang, Xuzhou (CN); Zhencai Zhu, Xuzhou (CN); Mingquan Qiu, Xuzhou (CN); Yong Ren, Xuzhou (CN); Gongbo Zhou, Xuzhou (CN); Yuxing Peng, Xuzhou (CN); Guohua Cao, Xuzhou (CN)

(73) Assignee: China University of Mining and Technology (CN)

( * ) Notice: Subject to any disclaimer, the term of this patent is extended or adjusted under 35 U.S.C. 154(b) by 0 days.

(21) Appl. No.: 15/558,768

(22) PCT Filed: Dec. 29, 2015

(86) PCT No.: PCT/CN2015/099323
§ 371 (c)(1),
(2) Date: Sep. 15, 2017

(87) PCT Pub. No.: WO2017/031895
PCT Pub. Date: Mar. 2, 2017

(65) Prior Publication Data
US 2018/0155132 A1    Jun. 7, 2018

(30) Foreign Application Priority Data
Aug. 24, 2015  (CN) .......................... 2015 1 0523701

(51) Int. Cl.
*B65G 43/02* (2006.01)
*B65G 45/12* (2006.01)
(Continued)

(52) U.S. Cl.
CPC ............ *B65G 43/02* (2013.01); *E21F 13/066* (2013.01); *G01B 11/026* (2013.01); *G01B 11/14* (2013.01);
(Continued)

(58) Field of Classification Search
None
See application file for complete search history.

(56) References Cited

U.S. PATENT DOCUMENTS

| | | | | |
|---|---|---|---|---|
| 4,303,276 A | * | 12/1981 | Braun ................... | B65G 19/28 238/219 |
| 7,556,140 B2 | * | 7/2009 | Swinderman .......... | B65G 45/16 198/499 |
| 9,139,375 B2 | * | 9/2015 | Tout ....................... | B65G 23/44 |

FOREIGN PATENT DOCUMENTS

| CN | 201351043 Y | 11/2009 |
|---|---|---|
| CN | 102745478 A | 10/2012 |

(Continued)

OTHER PUBLICATIONS

Document with English abstracts of foreign references, 3 pages.
SIPO, International Search Report issued on PCT application No. CN2015/099323, dated Jun. 7, 2016, 2 pages.

*Primary Examiner* — Kavel Singh
(74) *Attorney, Agent, or Firm* — Greenberg Traurig, LLP

(57) ABSTRACT

A fracture detection system and method for a dumbbell pin of a scraper conveyor. The system comprises a scraper conveyor, a wireless ranging apparatus (2), a wireless communication device, a support controller and a monitoring center. The wireless ranging apparatus (2) is mounted on a ramp plate ledge of a scraper conveyor chute (1), and has a laser range finder and a reflection target plate (24) for detecting a relative displacement between any two adjacent chutes. The wireless communication device realizes communication between the wireless ranging apparatus (2) and (Continued)

the support controller, and transmits the displacement of the laser range finder to the support controller in a wireless transmission manner. The support controller controls an action of the scraper conveyor chute (1). A monitoring center is electrically connected to the support controller, and can perform storage processing on relative displacement data of any adjacent chutes. In the method, by taking a relative displacement value between adjacent chutes as a reference, whether a fracture fault occurs in a dumbbell pin is judged, the position of the fractured dumbbell pin can be accurately determined, and a support controller controls a chute action, thereby having a high promotion and usage value.

1 Claim, 3 Drawing Sheets

(51) Int. Cl.
*B65G 45/00* (2006.01)
*E21F 13/06* (2006.01)
*G01B 11/14* (2006.01)
*G01S 17/08* (2006.01)
*G01S 17/88* (2006.01)
*G01B 11/02* (2006.01)
*B65G 19/18* (2006.01)

(52) U.S. Cl.
CPC .............. *G01S 17/08* (2013.01); *G01S 17/88* (2013.01); *B65G 19/18* (2013.01); *B65G 2201/04* (2013.01); *B65G 2203/0275* (2013.01); *B65G 2203/044* (2013.01); *G01B 2210/58* (2013.01)

(56) References Cited

FOREIGN PATENT DOCUMENTS

| | | | |
|---|---|---|---|
| CN | 103144936 A | * | 6/2013 |
| CN | 102431784 B | | 7/2014 |
| CN | 104590852 A | | 5/2015 |
| CN | 105059869 A | | 11/2015 |
| JP | 0797029 A | | 4/1995 |
| JP | 2006282319 A | | 10/2006 |

* cited by examiner

FRACTURE DETECTION SYSTEM AND METHOD FOR DUMBBELL PIN OF SCRAPER CONVEYOR

CROSS REFERENCE TO RELATED APPLICATION

This application is a non-provisional application claiming priority from International Application No. PCT/CN/2015/099323, filed Dec. 29, 2015, which claims priority to Chinese Patent Application No. 201510523701.8, filed Aug. 24, 2015, each of which are incorporated herein by reference in their entirety.

FIELD OF THE DISCLOSURE

The present invention relates to pin fracture detection system and method, in particular to detection system and method for fracture of a dumbbell pin of a scraper conveyor.

BACKGROUND OF RELATED ART

The chutes of a scraper conveyer at a fully-mechanized mining face are connected by dumbbell pins. In the coal mining process, the fully-mechanized mining equipment is pushed forward continuously as the coal mining face varies. The dumbbell pins bear a huge impact load in the pushing process, and may be worn and fractured easily under the extremely high tensile force. In the chute pushing process, the resistance force against pushing increases continuously, and the pushing stroke is increased continuously. If any dumbbell pin is fractured, the connection of middle chutes may be dislocated or broken, causing a chain reaction that may affect the normal production at the working face or even result in breakdown of the entire coal mining system, and bringing a severe potential safety hazard.

At present, in most mines in China, the conventional manual inspection method is still used to detect fracture failures of dumbbell pins. Owing to the complex working environment in a mine shaft, the large quantity of dumbbell pins, and the heavy inspection workload, it is difficult to detect and replace fractured dumbbell pins timely. Consequently, safe mining operation can't be ensured in the mine shaft. Existing fracture detection techniques, including electromagnetic induction techniques, optical fiber sensor detection techniques, strain sensor detection techniques, and traction return current detection technique, etc., have poor feasibility, because of the complex working environments in mine shafts, difficulties in underground deployment, and susceptibility to external interferences.

SUMMARY

The present invention provides detection system and method for fracture of a dumbbell pin of a scraper conveyer, which overcome the drawbacks of manual detection, are simple and easy to implement, and easy to maintain.

To attain the object described above, the present invention employs the following technical scheme: a detection system for fracture of a dumbbell pin of a scraper conveyer, comprising a scraper conveyer, wireless distance measuring devices, wireless communication devices, support controllers and a monitoring center; the scraper conveyer chutes are in one-to-one correspondence with hydraulic supports disposed at a fully-mechanized mining face, and are arranged linearly along the working face of a coal cutter; the support controllers are mounted in the bases of the hydraulic supports, so as to control pushing/pulling actions for the hydraulic supports, and in one-to-one correspondence with the hydraulic supports; the wireless distance measuring devices are installed on coal shoveling plate chute sides of the scraper conveyer chutes, and communicate with the support controllers via the wireless communication devices; and the support controllers are electrically connected to the monitoring center through a CAN bus via an Ethernet gateway; the wireless communication devices are composed of ZigBee wireless digital transmission modules; the monitoring center comprises a signal processing system that employs ARM, DSP, or FPGA chips as microprocessors and digital display units in which MCGS industrial control software serves as the core.

The wireless distance measuring device comprises a guide device, a shoring mechanism, a fixed base, a laser distance measuring instrument, a reflection target plate, and fixing bolts, wherein, the guide device is welded to a coal shoveling plate chute side of the scraper conveyer chute, and works with the top surface of the chute side to form a guide slot; the shoring mechanism is fixed to the guide device by fixing bolts and can move in parallel along the guide slot; the laser distance measuring instrument is disposed in the fixed base, and is fixed to the shoring mechanism by fixing bolts; the reflection target plate is directly welded to the shoring mechanism corresponding to a laser projection direction.

The laser beam projection direction of the laser distance measuring instrument is in the same horizontal line as the center of the reflection target plate, and the laser distance measuring instruments are installed in the same positions in any two adjacent chutes.

A detection method for fracture of a dumbbell pin of a scraper conveyer, comprising the following steps:
  a) arranging the scraper conveyer chutes, hydraulic supports, and support controllers in a one-to-one correspondence relationship and numbering them uniformly, on the premise of ensuring straightness and evenness of the equipment at the fully-mechanized mining face;
  b) setting a threshold for displacement ratio: before the scraper conveyer is pushed forward, the distance between the laser distance measuring instrument fixed to the shoring mechanism and the reflection target plate is L (C<L<D); in the pushing-forward process of the scraper conveyer, owing to the limitation of the fitting length A between male connector and female connector of adjacent chutes and the length B of dumbbell pin rod, surely there are two limit positions of relative displacement in the relative translation process of two corresponding adjacent chutes before any dumbbell pin is fractured; at those limit positions, the resistance force against pushing is maximum, the dumbbell pins bear maximum tensile force and have maximum deformation, and the dumbbell pins are in a critical fracture state: the maximum distance between the laser distance measuring instrument and the reflection target plate when any two adjacent chutes move in the same direction in relation to each other is denoted as D, and the minimum distance between the laser distance measuring instrument and the reflection target plate when said two adjacent chutes move in opposite directions in relation to each other is denoted as C; to eliminate a judgment error, 0.9 C/L and 1.1 D/L are set as two thresholds M0% and N0%;
  c) wireless distance measurement: in the pushing-forward process of the scraper conveyer, the laser distance measuring instrument emits a laser signal, a time interval is required for the laser signal to reach the reflection target plate and then is reflected back to the laser distance measuring instrument, and the distance between the laser distance measuring instrument and the reflection target plate is ascertained according to the time interval; the wireless communication device converts the measured distance into electrical signal form and transmits the signal to the support controller wirelessly, and the support controller transmits the received data signal to the monitoring center; thus, a single measurement of the relative displacement between any two adjacent chutes is accomplished;

d) controlling the motions with the support controllers: the monitoring center processes the relative displacement data E of any two adjacent chutes and numbers the relative displacement data E in a specific order, obtains a relative displacement ratio N % (N %=E/L) through real-time computation, and compares the N % with the preset thresholds: if the data values meet M0%<N %<N0% at any time within every 5 s, it indicates that the dumbbell pins work normally; if N %<M0% or N %>N0% happens at any time within every 5 s, it can be judged that a dumbbell pin is fractured; in that case, the monitoring center analyzes the data and ascertains the position of the fractured dumbbell pin, transmits feedback information to the corresponding support controller to control the corresponding chute to stop, and shuts down the scraper conveyer for checking;

e) repeating the steps c) and d) to detect the fracture of any dumbbell pin of the scraper conveyer in real time.

According to the present invention, the relative displacement between any two adjacent chutes of a scraper conveyer is used as reference in a pushing process of the scraper conveyer, whether a dumbbell pin is fractured is judged accurately by comparing the relative displacement with preset thresholds, the position of a fractured dumbbell pin is ascertained quickly via a monitoring center, and feedback information is transmitted to the corresponding support controller to control the motions of the corresponding chutes. Thus, complicated manual work and blindness of manual detection are avoided, and the detection cycle is shortened greatly.

BRIEF DESCRIPTION OF THE DRAWINGS

FIG. 2-1 is a structural diagram of the wireless distance measuring device;

In the figures: 1—scraper conveyer chute; 2—wireless distance measuring device; 21—guide piece; 22—shoring mechanism; 23—fixed base; 24—reflection target plate; 25—fixing bolt; 26—wire connecting hole; 3—dumbbell pin.

DETAILED DESCRIPTION

Hereunder the present invention will be further explained with reference to the accompanying drawings.

Figure 2:
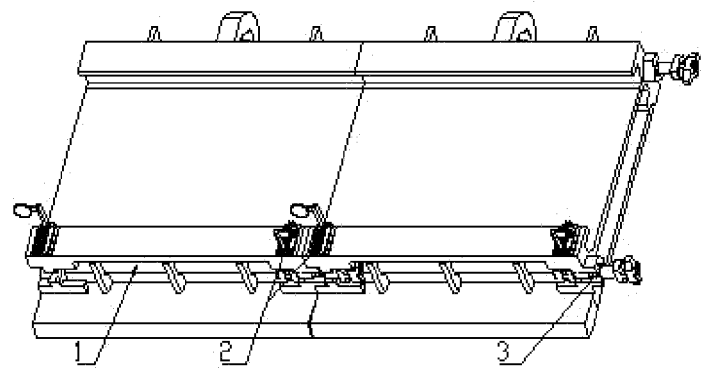
FIG. 2 is an installation schematic diagram of the wireless distance measuring device in the present invention.
Figures 1, 2:
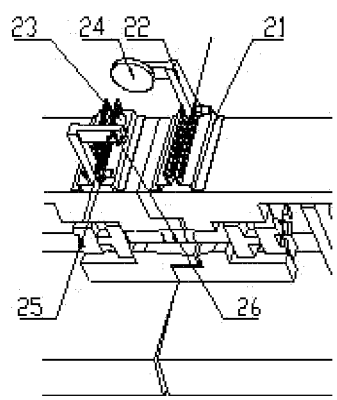

As shown in FIG. 2, the detection system for fracture of a dumbbell pin of a scraper conveyer in the present invention comprises scraper conveyer chutes, wireless distance measuring devices, wireless communication devices, support controllers and a monitoring center; the scraper conveyer chutes 1 are in one-to-one correspondence with hydraulic supports disposed at a fully-mechanized mining face, and are arranged linearly along the working face of a coal cutter; the support controllers are mounted in the bases of the hydraulic supports, so as to control pushing/pulling actions for the hydraulic supports, and in one-to-one correspondence with the hydraulic supports; the wireless distance measuring devices 2 are installed on coal shoveling plate chute sides of the scraper conveyer chutes, and communicate with the support controllers via the wireless communication devices; and the support controllers are electrically connected to the monitoring center through a CAN bus via an Ethernet gateway; the wireless communication devices are composed of ZigBee wireless digital transmission modules; the monitoring center comprises a signal processing system that employs ARM, DSP, or FPGA chips as microprocessors and digital display units in which MCGS industrial control software serves as the core.

The wireless distance measuring device 2 comprises a guide device 21, a shoring mechanism 22, a fixed base 23, a laser distance measuring instrument, a reflection target plate 24, and fixing bolts 25, wherein, the guide device 21 is welded to a coal shoveling plate chute side of the scraper conveyer chute, and works with the top surface of the chute side to form a guide slot; the shoring mechanism 22 is fixed to the guide device 21 by fixing bolts 25 and can move in parallel along the guide slot; the laser distance measuring instrument is disposed in the fixed base 23, and is fixed to the shoring mechanism 22 by fixing bolts 25; the reflection target plate 24 is directly welded to the shoring mechanism corresponding to a laser projection direction; the shoring mechanism 22 is arranged with wire connecting holes 26 for wiring for power supply and the wireless communication device; the laser beam projection direction of the laser distance measuring instrument is in the same horizontal line as the center of the reflection target plate 24, and the laser distance measuring instruments are installed in the same positions in any two adjacent chutes.

Figure 1:
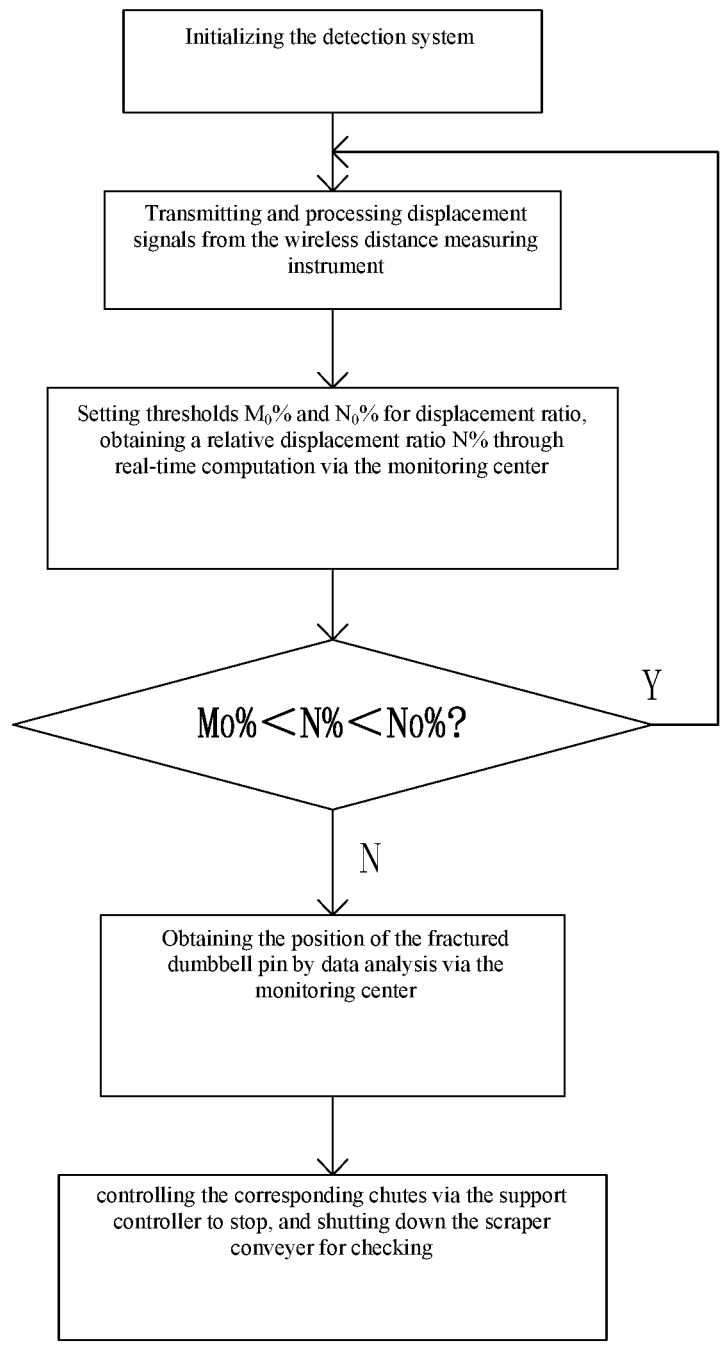
FIG. 1 is a schematic flow diagram of the detection method for fracture of a dumbbell pin in the present invention.
Figure 3:
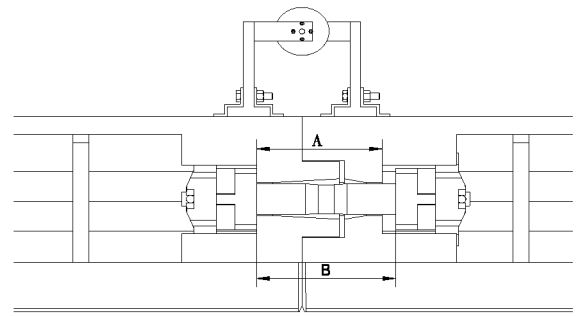
FIG. 3 is a schematic diagram of fitting dimensions of a dumbbell pin base in the present invention.
Figure 4:
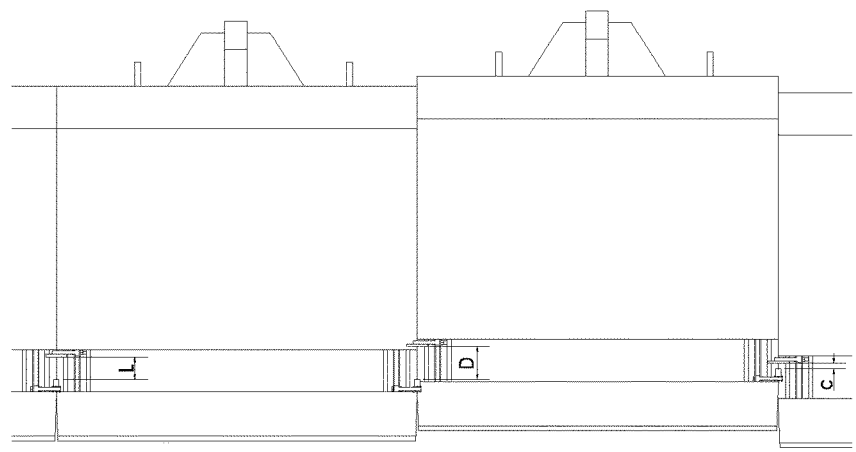
FIG. 4 is a schematic diagram of adjacent chutes in a critical state in a fracture detection process according to an embodiment of the present invention.

As shown in FIGS. 1, 3 and 4, a detection method for fracture of a dumbbell pin of a scraper conveyer, comprising the following steps:

a) arranging the scraper conveyer chutes, hydraulic supports, and support controllers in a one-to-one correspondence relationship and numbering them uniformly to 1, 2, . . . , N−1, N, on the premise of ensuring straightness and evenness of the equipment at the fully-mechanized mining face;

b) setting a threshold for displacement ratio: before the scraper conveyer is pushed forward, the distance between the laser distance measuring instrument fixed to the shoring mechanism 22 and the reflection target plate 24 is L (C<L<D); in the pushing-forward process of the scraper conveyer, owing to the limitation of the fitting length A between male connector and female connector of adjacent chutes and the length B of dumbbell pin rod, surely there are two limit positions of relative displacement in the relative translation process of two corresponding adjacent chutes before any dumbbell pin 3 is fractured; at those limit positions, the resistance force against pushing is maximum, the dumbbell pins bear maximum tensile force and have maximum deformation, and the dumbbell pins are in a critical fracture state: the maximum distance between the laser distance measuring instrument and the reflection target plate when any two adjacent chutes move in the same direction in relation to each other is denoted as D, and the minimum distance between the laser distance measuring instrument and the reflection target plate when said two adjacent chutes move in opposite directions in relation to each other is denoted as C; to eliminate a judgment error, 0.9 C/L and 1.1 D/L are set as two thresholds $M_0\%$ and $N_0\%$;

c) wireless distance measurement: in the pushing-forward process of the scraper conveyer, the laser distance measuring instrument emits a laser signal, a time interval is required for the laser signal to reach the reflection target plate 24 and then is reflected back to the laser distance measuring instrument, and the distance between the laser distance measuring instrument and the reflection target plate is ascertained according to the time interval; the wireless communication device converts the measured distance into electrical signal form and transmits the signal to the support controller wirelessly, and the support controller transmits the received data signal to the monitoring center; thus, a single measurement of the relative displacement between any two adjacent chutes is accomplished;

d) controlling the motions with the support controllers: the monitoring center processes the relative displacement data E of any two adjacent chutes and numbers the relative displacement data E in a specific order, obtains a relative displacement ratio N % (N %=E/L) through real-time computation, and compares the N % with the preset thresholds: if the data values meet $M_0\% < N\% < N_0\%$ at any time within every 5 s, it indicates that the dumbbell pins work normally; if N $\% < M_0\%$ or N $\% > N_0\%$ happens at any time within every 5 s, it can be judged that a dumbbell pin is fractured; in that case, the monitoring center analyzes the data and ascertains the position of the fractured dumbbell pin, transmits feedback information to the corresponding support controller to control the corresponding chute to stop, and shuts down the scraper conveyer for checking;

e) repeating the steps c) and d) to detect the fracture of any dumbbell pin of the scraper conveyer in real time.

Above are just preferred embodiments of the present invention. Those skilled in the art should recognize that various variations and modifications can be made without departing from the principle of the present invention. All of such variations and modifications shall be deemed as falling into the protected scope of the present invention.

We claim:

1. A detection method of the detection system for fracture of a dumbbell pin of a scraper conveyer, the scraper conveyer comprising a plurality of scraper conveyer chutes;
wireless distance measuring devices;
wireless communication devices;
support controllers; and
a monitoring center, wherein, the scraper conveyer chutes are in one-to-one correspondence with hydraulic supports disposed at a fully-mechanized mining face, and are arranged linearly along the working face of a coal cutter; the support controllers are in one-to-one correspondence with the hydraulic supports;

the wireless distance measuring devices are installed on coal shoveling plate chute sides of the scraper conveyer chutes, and communicate with the support controllers via the wireless communication devices; and the support controllers are electrically connected to the monitoring center through a CAN bus via an Ethernet gateway, the method comprising the following steps:

a) arranging the scraper conveyer chutes, hydraulic supports, and support controllers in a one-to-one correspondence relationship and numbering them uniformly, on the premise of ensuring straightness and evenness of the equipment at the fully-mechanized mining face;

b) setting a threshold for displacement ratio: before the scraper conveyer is pushed forward, the distance between the laser distance measuring instrument fixed to the shoring mechanism and the reflection target plate is L (C<L<D); in the pushing-forward process of the scraper conveyer, owing to the limitation of the fitting length A between male connector and female connector of adjacent chutes and the length B of dumbbell pin rod, surely there are two limit positions of relative displacement in the relative translation process of two corresponding adjacent chutes before any dumbbell pin is fractured; at those limit positions, the resistance force against pushing is maximum, the dumbbell pins bear maximum tensile force and have maximum deformation, and the dumbbell pins are in a critical fracture state: the maximum distance between the laser distance measuring instrument and the reflection target plate when any two adjacent chutes move in the same direction in relation to each other is denoted as D, and the minimum distance between the laser distance measuring instrument and the reflection target plate when said two adjacent chutes move in opposite directions in relation to each other is denoted as C; to eliminate a judgment error, 0.9 C/L and 1.1 D/L are set as two thresholds M0% and N0%;

c) wireless distance measurement: in the pushing-forward process of the scraper conveyer, the laser distance measuring instrument emits a laser signal, a time interval is required for the laser signal to reach the reflection target plate and then is reflected back to the laser distance measuring instrument, and the distance between the laser distance measuring instrument and the reflection target plate is ascertained according to the time interval; the wireless communication device converts the measured distance into electrical signal form and transmits the signal to the support controller wirelessly, and the support controller transmits the received data signal to the monitoring center; thus, a single measurement of the relative displacement between any two adjacent chutes is accomplished;

d) controlling the motions with the support controllers: the monitoring center processes the relative displacement data E of any two adjacent chutes and numbers the relative displacement data E in a specific order, obtains a relative displacement ratio N % (N %=E/L) through real-time computation, and compares the N % with the preset thresholds: if the data values meet M0%<N %<N0% at any time within every 5 s, it indicates that the dumbbell pins work normally; if N %<M0% or N %>N0% happens at any time within every 5 s, it can be judged that a dumbbell pin is fractured; in that case, the monitoring center analyzes the data and ascertains the position of the fractured dumbbell pin, transmits feedback information to the corresponding support controller to control the corresponding chute to stop, and shuts down the scraper conveyer for checking; and e) repeating the steps c) and d) to detect the fracture of any dumbbell pin of the scraper conveyer in real time.

\* \* \* \* \*